3,264,242
AQUEOUS DISPERSIONS CONTAINING ALKYL-
ATED DIPHENYLOXIDEDISULFONIC ACID AND
A NON-IONIC SURFACE ACTIVE AGENT
Arthur S. Teot, Midland, Mich., assignor to The Dow
Chemical Company, Midland, Mich., a corporation of
Delaware
No Drawing. Filed Oct. 3, 1961, Ser. No. 142,484
8 Claims. (Cl. 260—29.6)

The present invention relates to a new and useful method of dispersing solids in aqueous media which are not solvents for the solids. More particularly, the present invention relates to dispersion of pigments and other solids in aqueous media.

Recent developments in dispersing agents have materially reduced the mechanical power requirements necessary to disperse solids in aqueous media, such as, for example, dispersion of opaquing pigments and the like into aqueous vehicles for paints, printing inks, and the like. Many of the known dispersing agents give excellent results in specific applications but are of limited operability in the major portion of applications wherein solid opaquing and/or coloring materials are required to be dispersed into aqueous media. Thus, for example, many dispersing agents useful in dispersing one class of solids in a particular aqueous medium is not useful for dispersing the same class of solids in another aqueous system. Other problems are represented by the attempts to disperse hydrophobic solids in aqueous media and aqueous systems of varying pH. The problems attendant to dispersion in general are many and varied and the discovery of a dispersing agent having wider application in aqueous media for both hydrophilic and oleophilic solids would be highly desirable.

It is, therefore, an object of the present invention to provide a method for dispersing most pigments and other solids in a wide variety of aqueous media. It is a further object of the present invention to provide a method for dispersing pigments and other solids wherein the dispersant employed is stable under the severe conditions encountered in the many applications of the dispersion. These and other objects will become apparent to those skilled in the art to which the invention pertains.

It has now been found that a mixture of an alkylated diphenyl oxide disulfonic acid or its alkali metal salt ,i.e. a diphenyl oxide which can be mono- or dialkylated and disulfonated) and a nonionic surface-active agent when employed in an amount from 0.01% to 20.0% by weight on the pigment or solid to be dispersed, produces a micro-dispersion of the solid in the aqueous medium. The class of sulfonic acid compounds which has been found to be useful in accordance with the present invention is that consisting of the diphenyl oxides having the following formula

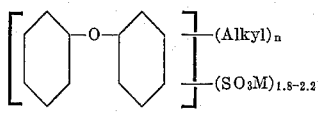

wherein the alkyl radical has from 8 to 18 carbon atoms, inclusive; the symbol $n$ represents an integer from 1 to 2; the symbol M represents an alkali metal.

The nonionic surface active agents which when employed in conjunction with the sulfonic acid salts above set forth produce a lower viscosity of the aqueous medium-pigments (solid) dispersion are those of the following general classes:

A. Alkylphenols reacted with from 2 to 20 moles of an alkylene oxide or mixture of alkylene oxides more commonly referred to as alkylaryl polyether alcohols.

B. Polyglycol esters, i.e., propylene glycol monostearates.

C. Alkanolamine fatty condensates.

D. Long-chain alcohol-alkylene oxide condensates.

Most of these materials are not exact chemical compounds and are identifiable only by tradename such as (A) Dowfax 9N9 and 9N4, Advawet 10, Agrimul 70A, Igepal CO–630, and Triton X–100; (B) Advawet 33, Aldol 25, and Myrj 45; (C) Alkamine C, Stepan LDA, Ninol 1001, and Aerosol; (D) Alkanol HC and Brij 30, to name only a few. A complete list of such nonionic surface active agents is found in John W. McCutcheon's 1958 reprint from Soap & Chemical Specialities, Surfactants Index, fourth revision.

The two materials can be employed as an aqueous concentrate, i.e. sufficient water to maintain both ingredients in the liquid state, in the proportion of .1 to 10 parts by weight based on 1 part of the other.

Representative of the above-described dispersants which can be employed in accordance with the present invention are the alkali metal salts of alkylated disulfonates such as, for example, the sodium nonyldiphenyl oxide disulfonate, lithium, heptadecyldiphenyl oxide disulfonate, potassium dodecyldiphenyl oxide disulfonate, cesium octyldiphenyl oxide disulfonate, sodium octyldiphenyl oxide disulfonate, sodium dodecyldiphenyl oxide disulfonate, sodium dioctyldiphenyl oxide disulfonate, and the like.

The above described materials can be employed as the dispersants in most aqueous vehicle base compositions as, for example, rotogravure printing ink compositions composed principally of water, glycols and a pigment; latex paints containing an aqueous dispersion of a film forming organic resin, i.e., styrene-butadiene; acrylics, and the like.

The above list of aqueous media or systems in which the method of the present application is operable is only representative of the many types of aqueous media, including aqueous dispersions of resins and polymers in which pigment or solid is dispersed to obtain opaque and/or colored compositions employed in industry and is intended to illustrate only the diverse nature of the applicability of the compositions and methods hereinafter described in detail.

It is to be understood that any pigment or opaquing agent can be more adequately dispersed in an aqueous medium employing the dispersants of the present invention. Thus, one can disperse the inorganic pigments such as lead chromate, carbon black, zinc oxide, titanium dioxide, iron oxide, calcium carbonate, cadmium sulfide as well as the organic pigments or opaquing agents such as the phthalocyanines, as, for example, copper phthalocyanine, aluminum stearate and the like, the clays such as kaolin and the like, to name only a few.

The following examples illustrate the present invention but are not to be construed as limiting.

*Example 1*

A mixture of equal parts by weight of sodium dodecyl diphenyl oxide disulfonate (Benax 2A1) and a nonionic surfactant (Dowfax 9N9) made by the condensation of nonylphenol and 9 moles of ethylene oxide was prepared and added to an aqueous pigment slurry containing 50% by weight $TiO_2$ in a concentration of 0.2% based on the pigment weight. The viscosity of this pigment slurry was measured on a Stormer rotational viscosimeter before and after the addition of the dispersant mixture giving 234 cps. and 84 cps. respectively. This is a reduction of 150 cps.

On the other hand, addition of 0.2% sodium dodecyldiphenyl oxide disulfonate alone gave a viscosity reduction of 18 cps. while the nonylphenol-ethylene oxide surfactant alone at the same concentration mildly flocculated the slurry, i.e. raised the viscosity by 8 cps.

*Example 2*

A slurry of 44% by weight CdS was prepared in water and the viscosity measurement on a Stormer rotational viscosimeter gave 124 cps. Addition of 0.25% (on pigment weight) of 1:1 mixture Benax 2A1 and Dowfax 9N9 to this slurry reduced the viscosity to 72 cps. At the same concentration, 0.25% Benax 2A1 alone gave a viscosity of 74 cps. and 0.25% Dowfax 9N9 alone did not reduce the viscosity of the CdS slurry at all.

*Example 3*

In this example a 50% aqueous $TiO_2$ slurry was employed and the dispersing agent was a 1:1 mixture by weight of Benax 2A1 and polyoxyethylene sorbitan monooleate (Tween 80). The viscosity of the slurry initially was 252 cps. and after addition of 0.2% of the dispersant mixture was 122 cps. i.e. a reduction of 130 cps. Under the same conditions, Dowfax 2A1 alone or Tween 80 alone reduced the viscosity by only 16 cps.

*Example 4*

Utilizing the same procedure as above, a slurry of 50% $Fe_2O_3$ in water was prepared and the viscosity measured on a Stormer rotational viscosimeter. The surfactants were added to provide 0.15% a weight percent of Benax 2A1 or Dowfax 9N9, or Tween 80 (polyoxyethylene sorbitan monooleate) as well as mixtures of Dowfax 9N9 or Tween 80 with Dowfax 2A1 to provide the same weight percent of surfactant:

| Dispersant | Benax 2A1 Viscosity Reduction* | Codispersant Viscosity Reduction* | Misture Viscosity Reduction* |
|---|---|---|---|
| Dowfax 9N9: Benax 2A1 | 34 | 70 | 153 |
| Tween 80: Benax 2A1 | 11 | 72 | 183 |

*The difference in viscosity (cps.) between the $Fe_2O_3$ slurry without dispersant and the viscosity after addition of 0.15% of the stated surfactant or surfactant mixture.

I claim:
1. An aqueous dispersion of solids containing a composition comprising one part by weight of an alkali metal salt of alkylated diphenyl oxide disulfonic acid having from 8 to 18 carbon atoms in each alkyl moiety and an average of from 1.8 to 2.2 sulfonic acid moieties per diphenyl oxide radical and from 1/9 to 9 parts by weight of a nonionic surface-active agent.

2. A method for reducing the viscosity of aqueous pigment dispersions which comprises introducing into said dispersion from 0.01 to 20% by weight, based on said pigment, of the composition of claim 1.

3. A method for dispersing pigment and opaquing materials in a non-solvent aqueous liquid medium which comprises mixing with said aqueous medium and said solid, an effective amount of mixture of an alkylated diphenyl oxide disulfonate dispersant having the formula

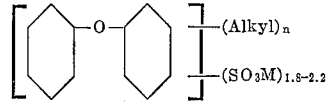

wherein the alkyl radical has from 8 to 18 carbon atoms, inclusive; $n$ represents an integer from 1 to 2, M represents an alkali metal and a nonionic surface active agent.

4. The method of claim 3 wherein the liquid medium is a latex paint composition.

5. The method of claim 3 wherein the liquid medium is an aqueous printing ink.

6. The method of claim 3 wherein the liquid medium comprises an aqueous dispersion of an organic film-forming resin.

7. An aqueous dispersion of solids containing a composition consisting essentially of 50% by weight of sodium dodecyldiphenyl oxide disulfonate and 50% by weight of nonylphenoxyoctaethoxy ethanol.

8. A 50% by weight aqueous slurry of titanium oxide containing as the essential dispersant 0.2% by weight of the composition of claim 1.

References Cited by the Examiner

UNITED STATES PATENTS

| | | | |
|---|---|---|---|
| 2,081,876 | 5/1937 | Prahl | 260—512 |
| 2,802,799 | 8/1957 | Johnson | 260—29.7 |
| 2,809,122 | 10/1957 | Willis et al. | 106—308 |
| 2,854,477 | 9/1958 | Steinhauer | 260—512 |
| 2,855,367 | 10/1958 | Buck | 252—161 |
| 2,943,058 | 6/1960 | Cook | 252—161 |
| 2,990,375 | 6/1961 | Steinhauer et al | 252—161 |
| 3,000,832 | 9/1961 | Kooijman et al. | 252—161 |
| 3,067,053 | 12/1962 | Tarantino | 260—29.7 |

FOREIGN PATENTS 790,070   2/1958   Great Britain.

MURRAY TILLMAN, *Primary Examiner.*

WILLIAM H. SHORT, *Examiner.*

E. B. WOODRUFF, P. LIEBERMAN,
*Assistant Examiners.*